(12) United States Patent
Shelton et al.

(10) Patent No.: US 12,521,263 B2
(45) Date of Patent: Jan. 13, 2026

(54) VALVE CRIMPING WITHOUT AN INTERNAL SUPPORT MEMBER

(71) Applicant: Cephea Valve Technologies, Inc., Santa Clara, CA (US)

(72) Inventors: Russell Shelton, San Jose, CA (US); Randolf Von Oepen, Aptos, CA (US)

(73) Assignee: Cephea Valve Technologies, Inc., Abbott Park, IL (US)

( * ) Notice: Subject to any disclaimer, the term of this patent is extended or adjusted under 35 U.S.C. 154(b) by 912 days.

(21) Appl. No.: 17/731,812

(22) Filed: Apr. 28, 2022

(65) Prior Publication Data

US 2022/0354678 A1 Nov. 10, 2022

Related U.S. Application Data

(60) Provisional application No. 63/184,302, filed on May 5, 2021.

(51) Int. Cl.
*A61F 2/24* (2006.01)
*A61F 2/95* (2013.01)

(52) U.S. Cl.
CPC .......... *A61F 2/9525* (2020.05); *A61F 2/2415* (2013.01); *A61F 2/2418* (2013.01); *A61F 2/2436* (2013.01); *A61F 2230/0067* (2013.01)

(58) Field of Classification Search
CPC .................................................. A61F 2/9525
See application file for complete search history.

(56) References Cited

U.S. PATENT DOCUMENTS

| | | | |
|---|---|---|---|
| 11,534,296 B2 | 12/2022 | Morin | |
| 11,896,486 B2 | 2/2024 | Pasquino | |
| 2013/0116770 A1 | 5/2013 | Robinson | |
| 2014/0144000 A1 | 5/2014 | Creaven | |
| 2016/0302921 A1 | 10/2016 | Gosal | |
| 2018/0092744 A1 | 4/2018 | von Oepen et al. | |
| 2019/0117394 A1 | 4/2019 | Morin | |
| 2020/0129292 A1 | 4/2020 | Haynes et al. | |
| 2021/0196460 A1* | 7/2021 | Achiluzzi | A61F 2/9522 |

* cited by examiner

*Primary Examiner* — Suba Ganesan
(74) *Attorney, Agent, or Firm* — SLEMAN & LUND LLP (57) ABSTRACT

A loading device for crimping a prosthetic heart valve without an internal support member includes a cone having a cone body with a tapering diameter and defining a lumen therethrough and a cone base extending radially from the cone body. The cone base may couple to a funnel also having a tapering diameter and defining a lumen therethrough. The cone may be coupled to the funnel such that the lumen of the cone is aligned with the lumen of the funnel along a longitudinal axis of the loading device. The cone body may define a plurality of slots configured to receive the tines extending from the prosthetic heart valve as the valve is pulled through the loading device and compressed from an expanded state to a collapsed state by the tapering diameter of the cone and the funnel to be disposed inside a delivery device.

20 Claims, 4 Drawing Sheets

VALVE CRIMPING WITHOUT AN INTERNAL SUPPORT MEMBER

CROSS-REFERENCE TO RELATED APPLICATIONS

This application claims the benefit of the filing date of U.S. Provisional Application No. 63/184,302 filed May 5, 2022, the disclosure of which is hereby incorporated by reference herein in its entirety.

BACKGROUND OF THE DISCLOSURE

Valvular heart disease, and specifically aortic and mitral valve disease, is a significant health issue in the United States. The mitral valve lies between the left atrium and the left ventricle of the heart. Various diseases can affect the function of the mitral valve, including degenerative mitral valve disease and mitral valve prolapse. These diseases can cause mitral stenosis, in which the valve fails to open fully and thereby obstructs blood flow, and/or mitral insufficiency, in which the mitral valve is incompetent and blood flows passively in the wrong direction.

Many patients with heart disease, such as problems with the mitral valve, are intolerant of the trauma associated with open-heart surgery. Age or advanced illness may have impaired the patient's ability to recover from the injury of an open-heart procedure. Additionally, the high costs associated with open-heart surgery and extra-corporeal perfusion can make such procedures prohibitive.

Patients in need of cardiac valve repair or cardiac valve replacement can be served by minimally invasive surgical techniques. In many minimally invasive procedures, small devices are manipulated within the patient's body under visualization from a live imaging source like ultrasound, fluoroscopy, or endoscopy. Minimally invasive cardiac procedures are inherently less traumatic than open procedures and may be performed without extra-corporeal perfusion, which carries a significant risk of procedural complications.

During minimally invasive procedures for mitral valve replacement, the mitral valve prosthesis generally must be collapsed into a small delivery device for placement within the native mitral valve orifice. Such collapsing can be difficult and time-consuming. Typically, prosthetic heart valves that are collapsible are capable of expanding or re-expanding by either balloon expansion or self-expansion. For balloon-expandable prosthetic heart valves, the conventional method of loading the prosthetic heart valve onto a balloon of a delivery device includes the use of a crimping device that forces the prosthetic heart valve to collapse (or crimp) over the balloon. For self-expandable prosthetic heart valves, the conventional method of loading the prosthetic heart valve into a delivery device involves pulling (or pushing) the valve through a funnel so that, as the valve moves from the large end of the funnel to the small end of the funnel, the prosthetic heart valve tends to collapse. Some collapsible prosthetic heart valves include a support on the inside of the prosthetic heart valve while the prosthetic heart valve is pulled (or pushed) through the funnel, with the support member being rigid or inflatable. When used, the support member serves to assist the frame structure, and the prosthetic valve leaflets positioned therein, to collapse uniformly and not fold inward on itself due to the force applied by the shape of the funnel. Efficiency of the device preparation process may be improved by removing the need for an inner support member. An improved means for achieving the uniform collapse of the valve is therefore desired.

BRIEF SUMMARY OF THE DISCLOSURE

Safe and efficient delivery systems, loading devices, and methods for replacement of a cardiac valve that address one or more of the above concerns are described herein. The disclosure describes an apparatus and method of using the apparatus to assist the uniform collapse of a prosthetic heart valve without the use of an internal support member. The loading device apparatus disclosed includes a cone having a tapering diameter and a lumen configured to receive a collapsible valve. The shape of the cone may promote the gradual and uniform collapse of the valve. The cone may further include longitudinal slots spaced around the surface of the cone configured to receive tines extending radially from the valve to allow the valve to translate relative to the cone without the tines contacting and scraping the interior surface of the cone.

In certain aspects of the disclosure, a loading system for collapsing a prosthetic heart valve may include a slotted cone having a cone body and a cone base. The cone body may extend from a first end to a second end and have a cone body surface. The cone body may have a first diameter at the first end and a second diameter less than the first diameter as the second end. The cone body may define a plurality of slots extending along the cone body surface between the first and second ends. The plurality of slots may be radially spaced around the cone body surface. The cone body may further define a lumen internal to the cone body surface. The cone base may extend radially outward from the second end of the cone body.

In further aspects of the disclosure, a loading system for collapsing a prosthetic heart valve may include a cone and a funnel. The cone may extend from a first cone end to a second cone end. The cone may have a cone body that is cone-shaped. The cone body may extend from a first cone body end to a second cone body end. The cone body may define a lumen therethrough having a lumen diameter that tapers as the lumen extends from the first cone body end to the second cone body end. The cone body may further have a cone body surface defining a plurality of slots therethrough. The cone may further have a cone base extending radially from the second cone body end. The funnel may be coupled to the cone base in an assembled condition of the loading system. The funnel may extend from the a first funnel end to a second funnel end and define a lumen therethrough having a funnel diameter tapering as the lumen extends from the first funnel end to the second funnel end.

A method for collapsing a prosthetic heart valve may include coupling a thread to a first end of the prosthetic heart valve in an expanded condition; orienting the prosthetic heart valve to align a plurality of tines extending radially from the prosthetic heart valve with a plurality of slots defined by a cone; and pulling the thread to pull the prosthetic heart valve in a loading direction to translate the prosthetic heart valve through a lumen of the cone, the cone having a tapering diameter to compress the prosthetic heart valve.

DETAILED DESCRIPTION

This disclosure includes an apparatus and method for loading a prosthetic heart valve into a delivery device. The loading devices described herein may be used to load a wide variety of replacement heart valves (also referred to herein as "prosthetic heart valves," "prosthetic valves" or "valves") into one or more delivery systems, which can then be used to deliver the prosthetic valves into the hearts of patients. In some cases, the loading devices may be used to compensate for the force required to load a prosthetic valve, which may be difficult to achieve with a long, flexible catheter such as that used for a trans-septal delivery system. For example, it may be difficult for a long flexible device to apply the necessary forces since flexibility of a device may compromise other characteristics, like tensile strength. The loading devices may be suitable for use with any type of prosthetic heart valve, including prosthetic mitral valves, aortic valves and tricuspid valves.

It should be noted that the use of the loading device is not limited to use with a prosthetic heart valve, but may be used with any collapsible apparatus. For example, although the device may be described herein for use with a prosthetic heart valve, the device may be used on the same or similar structures and features, such as other valves or prostheses that may need to be collapsed or radially compressed. As used herein, the terms "substantially," "generally," "approximately," and "about" are intended to mean that slight deviations from absolute are included within the scope of the term so modified. As used herein, the valve may assume an "expanded condition" and a "collapsed condition," which refer to the relative radial size of the valve. It should be noted that in different embodiments described throughout the disclosure, like numbers refer to like elements unless otherwise indicated.

To safely navigate a delivery device through tight spaces, the profile of the delivery device and/or catheter is preferably kept to a minimum. Minimizing the size of the delivery device and/or catheter can be accomplished, at least in part, by creating a prosthetic heart valve capable of collapsing to a small radial profile. As used herein, reference to a "collapsible/expandable" heart valve includes heart valves that are formed with a small cross-section that enables them to be delivered into a patient through a tube-like delivery apparatus in a minimally invasive procedure, and then expanded to an operable state once in place, as well as heart valves that, after construction, are first collapsed to a small cross-section for delivery into a patient and then expanded to an operable size once in place in the valve annulus. Collapsible/expandable prosthetic heart valves may be used to replace any heart valve including a mitral valve, tricuspid valve, aortic valve, or pulmonary valve.

Figure 1A:
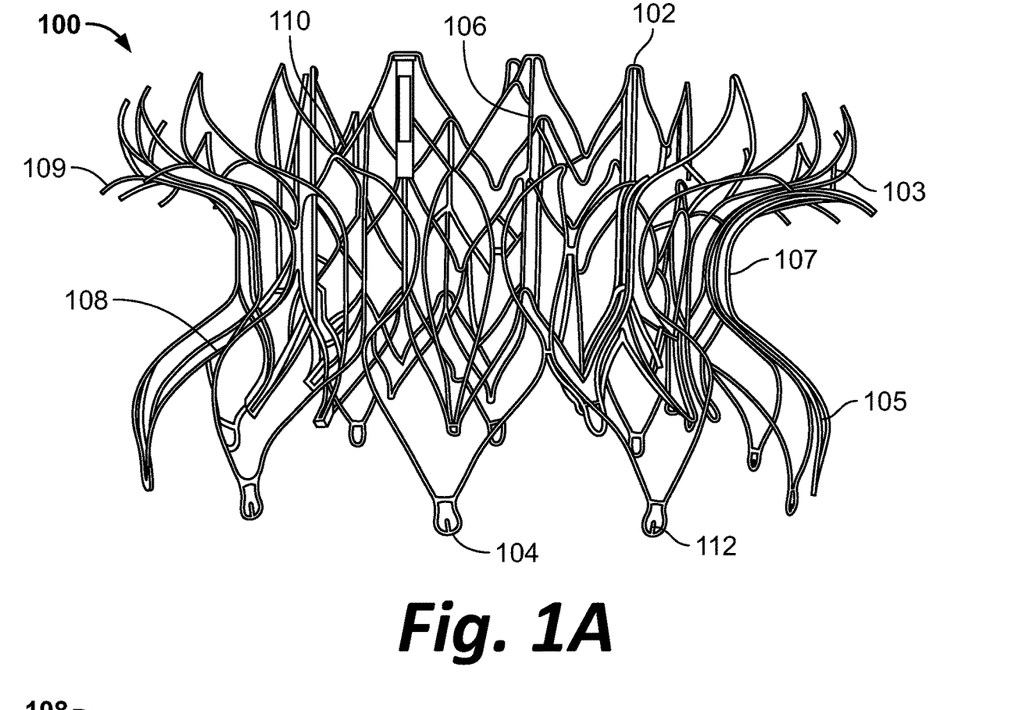
FIG. 1A is a perspective view of a prosthetic heart valve frame according to an embodiment of the disclosure.

FIG. 1A illustrates a prosthetic heart valve 100 in accordance with some embodiments of the disclosure. It should be understood that the prosthetic heart valve 100 illustrated in FIG. 1A omits certain features that would typically be included, such as a valve assembly to assist in controlling blood flow through the prosthetic heart valve, and interior and/or exterior fabrics or tissue skirts to assist with providing a seal around the prosthetic heart valve and/or with enhancing tissue ingrowth to fix the prosthetic heart valve within the native heart valve over time. However, for purposes of simplicity, the prosthetic leaflet(s) and skirt(s) are omitted from FIG. 1A for clarity of illustration.

The prosthetic heart valve 100 extends from a ventricular end 102 to an atrial end 104. The valve 100 includes an inner frame 106 and an outer frame or anchor assembly 108 positioned radially outward of the inner frame 106. The outer frame 108 may be primarily for anchoring the prosthetic heart valve 100 within the native heart valve annulus, while the inner frame 106 may be primarily for holding the prosthetic valve assembly in the desired position and orientation. The inner and outer frames 106, 108 can be assembled to form prosthetic valve frame 110, a support structure configured to fit within a native valve annulus.

Figure 1B:
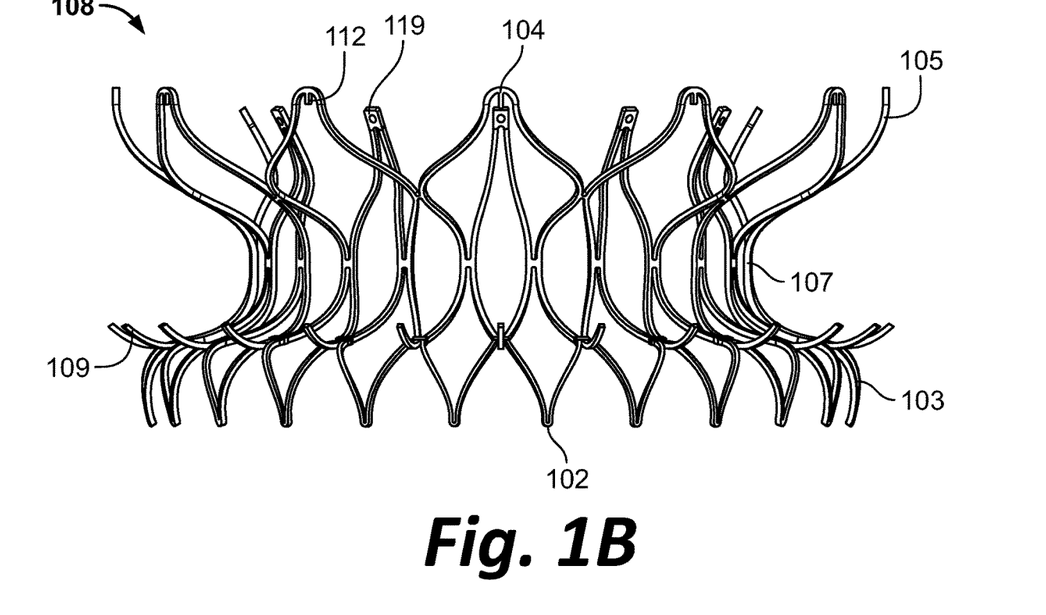
FIG. 1B is a side view of an outer frame of the prosthetic heart valve frame of FIG. 1A.

The outer frame 108 is illustrated more clearly in FIG. 1B, isolated from other components of the prosthetic heart valve 100. Outer frame 108 is illustrated in a vertically flipped orientation in FIG. 1B compared to FIG. 1A. The outer frame 108 includes a ventricular portion or anchor 103 near the ventricular end 102, an atrial portion or anchor 105 near the atrial end 104, and a central portion 107 coupling the ventricular and atrial portions 103, 105. The ventricular portion 103 may be configured and adapted to be disposed on the ventricular side of a native valve annulus, and may flare radially outwardly from the central portion 107. The atrial portion 105 may be configured and adapted to be disposed on an atrial side of the native valve annulus, and may also flare radially outwardly from the central portion 107. The central portion 107 may be configured to be situated in the valve orifice, for example in contact with the native valve annulus, and may have the shape of a narrow waist between the ventricular and atrial portions 103, 105. In use, the ventricular portion 103 and atrial portion 105 effectively clamp the native valve annulus on the ventricular and atrial sides thereof, respectively, holding the prosthetic heart valve 100 in place. The outer frame 108 may include barbs or tines 109 flaring radially outward from the outer frame 108 at the ventricular portion 103 to anchor prosthetic heart valve 100 in the native heart valve. Tines 109 may be spaced approximately equal distances apart around the outer circumference of the outer frame 108. When the outer frame 108 is in the expanded condition, the tines 109 may hook upwardly toward the atrial end 104 and terminate in a free end adapted to engage with and/or pierce native tissue. The free ends of the tines 109 may be blunt or sharp. The outer frame 108 further includes tabs 112 at the atrial end 104 of the outer frame 108. The tabs 112 may be evenly spaced around the circumference of the atrial end 104 of the outer frame 108. It should be noted that the tabs 112 in FIG. 1A are shown surrounded by a closed stent structure, while the tabs 112 in FIG. 1B are shown without any similar closed stent structures. In use, suture loops of a delivery device may hook onto or over the tabs 112 to keep the prosthetic heart valve 100 tethered to the delivery device via the suture loops. When it is desired to release the prosthetic heart valve 100 from its connection to the delivery device, the suture loops may be advanced distally to slide off the tabs 112, releasing the connection.

Figure 1C:
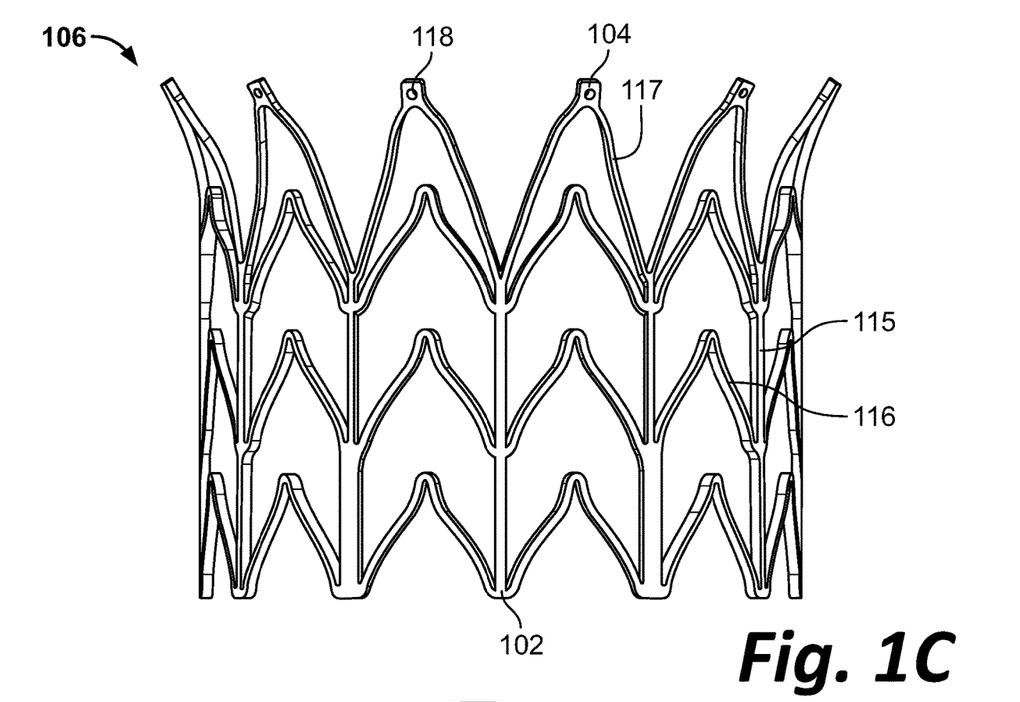
FIG. 1C is a side view of an inner frame of the prosthetic heart valve frame of FIG. 1A.

As illustrated in FIG. 1A, the inner frame 106 may be positioned radially within the outer frame 108 when the inner and outer frames are assembled together. The inner frame 106 is illustrated in FIG. 1C isolated from other components of the prosthetic heart valve 100. One or more prosthetic leaflets may be coupled to the inner frame 106 to allow unidirectional flow of blood through the prosthetic valve assembly from the atrial end 104 toward the ventricular end 102 of the prosthetic heart valve 100. Inner frame 106 is illustrated in a vertically flipped orientation in FIG. 1C compared to FIG. 1A. Inner frame 106 may include twelve longitudinal struts 115, with three rows of twelve v-shaped members 116. However, in other embodiments, more or fewer longitudinal struts 115 may be included, and more or fewer rows of v-shaped members 116 may be included. In other embodiments, inner frame 106 may be formed of diamond-shaped cells without longitudinal struts. In addition, v-shaped coupling members 117 may extend from each adjacent pair of longitudinal struts 115. These v-shaped couplings members 117 may have half-diamond shapes with the apex of each half-diamond shape including an aperture 118, the v-shaped coupling members 117 generally flaring radially outwardly in the expanded condition of inner frame 106. The inner frame 106 may be configured to expand circumferentially (and radially) while maintaining the same (or about the same) axial dimension (e.g., be non-foreshortening) as the prosthetic heart valve 100 expands from the collapsed delivery condition to the expanded condition. The axial struts 115 may contribute to this non-foreshortening functionality. By being non-foreshortening, the inner frame 106 may prevent (or reduce) strain from being placed on the prosthetic leaflets when the inner frame 106 transitions between the collapsed and expanded conditions. Thus, while the outer frame 108 may be designed to be foreshortening, the inner frame 106 may be designed so as to be substantially non-foreshortening. However, as noted above, inner frame 106 in other embodiments may be foreshortening, for example if formed of diamond-shaped cells. The inner frame 106 may couple to the outer frame 108 via the v-shaped coupling members 117. For example, the V-shaped coupling members 117 may be positioned in contact with generally similar shaped coupling members 119 on the outer frame 108 (best shown in FIG. 1B), and a rivet or other fastener may pass through apertures of the coupling members 117, 119.

Figure 1D:
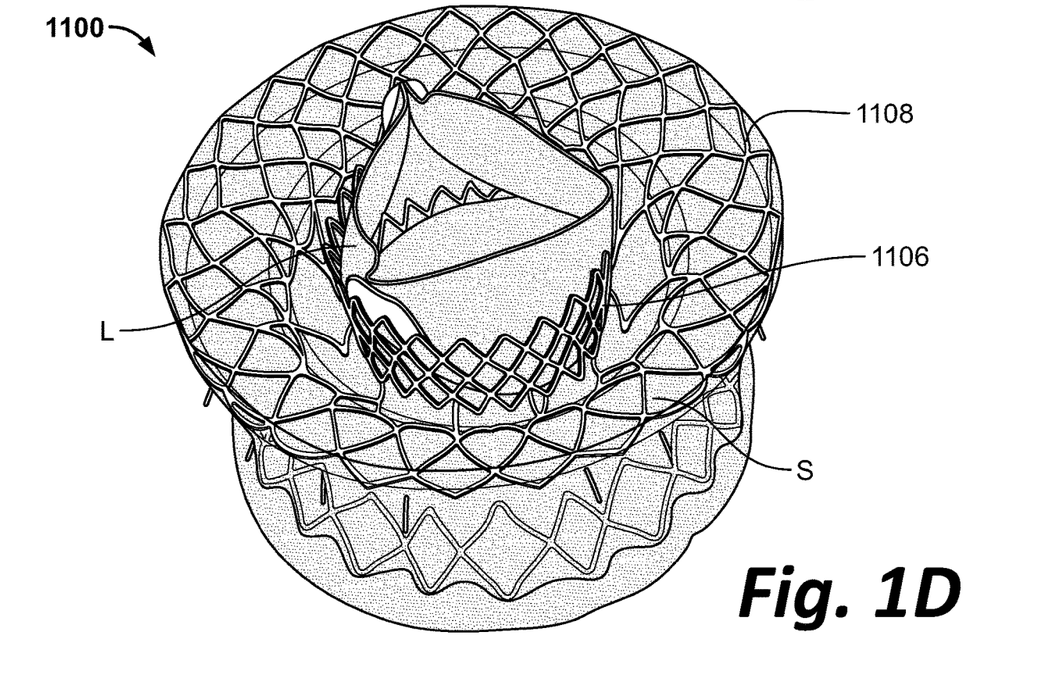
FIG. 1D is a perspective view from the ventricular side of a prosthetic heart valve according to an embodiment of the disclosure.

In some embodiments, the valve 100 may include a skirt covering the inner and/or outer surfaces of the inner frame 106 and/or the outer frame 108, and one or more leaflets positioned within a central channel of the frame 110 (and specifically the inner frame 106). An example of such a valve is shown in FIG. 1D, which illustrates the ventricular side of a prosthetic heart valve 1100. Briefly, prosthetic heart valve 1100 includes a plurality of prosthetic leaflets L coupled to the interior of an inner frame 1106, with the prosthetic leaflets L forming a valve assembly that is shown in FIG. 1D in an open condition. Although three prosthetic leaflets L are shown, it should be understood that in other embodiments fewer or more than three prosthetic leaflets may be provided. The inner frame 1106 may be positioned radially within, and coupled to, an outer frame 1108. Further, FIG. 1D illustrates a skirt S, which may be formed of fabric, tissue, or combinations thereof, on the inner frame 1106 and/or the outer frame 1108. The skirt S may be formed of a single piece of material or multiple pieces of material, and may extend over any one or more of the luminal and abluminal surfaces of the inner frame 1106 and the outer frame 1108. It should be understood that the inner frame 1106 may be substantially similar or identical to inner frame 106, while the outer frame 1108 may be similar or identical to outer frame 108.

Referring back to FIGS. 1A-C, the frame 110 may be configured to collapse to reduce an outer diameter of the frame 110 when the frame 110 is loaded into a loading device and/or delivery system. When the frame 110 is in an expanded condition, the outer frame 108 fully extends radially outward, as shown in FIGS. 1A-B. The valve 100 is naturally in an expanded state when no force is applied to the frame 110. When the valve 100 is in a collapsed condition, the frame 110 may at least partially collapse radially inward. The valve 100 may be placed in a collapsed condition by applying pressure on the outer frame 108 in a radially inward direction. In a collapsed condition, the valve 100 may have a higher degree of potential energy (e.g., is spring loaded) compared to when in the expanded condition.

Figure 2:
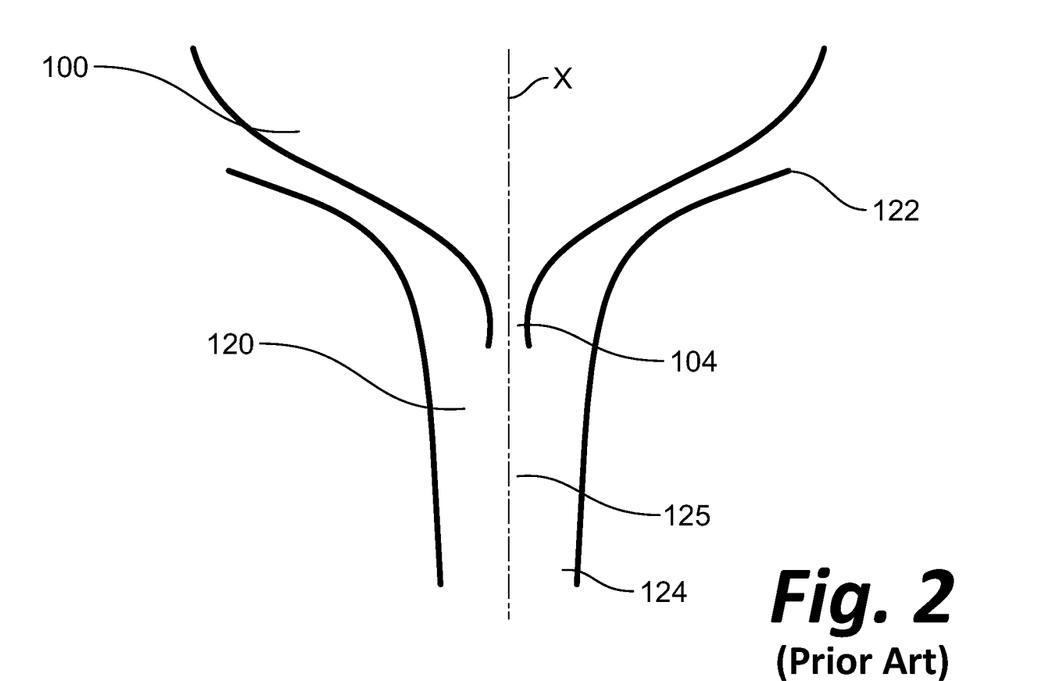
FIG. 2 is a schematic view of the valve of FIG. 1A being loaded into a loading device according to an embodiment of the prior art.

FIG. 2 illustrates a funnel 120 conventionally used for loading a prosthetic heart valve 100 into a delivery device. The funnel 120 extends from an entry end 122 to an exit end 124 and defines a lumen 125 therethrough, the lumen 125 having a tapering diameter corresponding to an inner surface of the funnel 120. That is, the lumen 125 may have the same diameter as the inner surface of the funnel 120 along any plane extending perpendicular to longitudinal axis X. When the funnel 120 is used as intended, a prosthetic heart valve may be translated through the funnel 120 in a loading direction, entering the funnel 120 at the entry end 122 and emerging from the funnel at the exit end 124. The funnel 120 has a first diameter at the entry end 122 and a second diameter at the exit end 124, the second diameter being smaller than the first diameter. The diameter of the funnel 120 may taper as the funnel 120 extends from the entry end 122 to the exit end 124. In some examples, such as the funnel 120 illustrated in FIG. 2, the rate at which the diameter of the funnel 120 tapers may vary such that the diameter tapers more rapidly near the entry end 122 than it tapers near the exit end 124. In other examples, the rate at which the diameter tapers may be consistent for the full length of the funnel. The second diameter at the exit end 124 may be smaller than the diameter of a catheter such that the exit end 124 of the funnel 120 may be nested or otherwise received inside a catheter. The exit end 124 of the funnel 120 may be disposed radially inward of the catheter so that the prosthetic heart valve 100 may be translated through the funnel 120 in the loading direction and transition smoothly from the funnel 120 into the catheter. That is, when the valve 100 is translated through the funnel 120 from the entry end 122 to the exit end 124, the valve 100 may substantially abut the interior surface of the funnel 120. Because the exit end 124 of the funnel 120 may be disposed radially inward of the catheter, the valve 100 may transition smoothly into the catheter. Although only a two-dimensional view of the funnel 120 is illustrated in FIG. 2, it should be understood that the funnel 120 has a depth which makes the funnel generally cone-shaped, extending 360 degrees around and configured to receive a prosthetic heart valve 100 through the lumen 125.

The valve 100 may be directly loaded into the catheter by pulling the valve 100 through the funnel 120 while the frame 110 of the valve 100 is supported by a rigid or inflatable support member (not shown) disposed radially inwardly of the frame 110 (and particularly radially inwardly of the inner frame 106). In some examples, the support member may be a ring-shaped element that abuts the inner circumference of the frame 110. In other examples, the support member may be an inflatable balloon as described in U.S. Appl. Publ. No.

2020/0129292, the disclosure of which is herein incorporated by reference. The valve 100, in an expanded condition, may be pulled on the atrial end 104 through the funnel 120 to transition to a collapsed condition. For example, the funnel 120 may be coupled to an opening of a delivery device, and a thread, or other string-like material (such as the suture loops described above), may extend from the delivery device and pass through the funnel 120 via the exit end 124 (e.g., in a direction opposite the loading direction). The suture loops may emerge from the entry end 122 of the funnel 120 and be wrapped around tabs 112 on the atrial end 104 of the valve 110. The suture loops extending from the delivery device may then be actuated such that the suture loops pull the valve 100 toward the delivery device (e.g., in the loading direction), passing the valve 100 through the funnel 120. The atrial end 104 of the valve 100 may contact the entry end 122 of the funnel 120, and the interior surface of the funnel may apply a force on the valve 100 directed radially inwardly. As the valve 100 translates through the funnel 120 in the loading direction, the tapering diameter of the funnel increases the radial force applied to the valve 100, which may cause a collapse in the radial profile of the valve 100. The method and apparatus of collapsing a prosthetic heart valve with a funnel is described in further detail in U.S. Appl. Publ. No. 2018/0092744, the disclosure of which is herein incorporated by reference. The diameter of the lumen 125 of the funnel 120 may taper at a relatively high rate, which may cause the force vector applied to the valve 100 to be substantially directed radially inward (e.g. orthogonal or substantially orthogonal to the longitudinal axis of lumen 125). Applying a force in such a direction may require the use of the internal support member to redirect the force vector farther in the loading direction (e.g., toward the exit end 124). The internal support member may assist the frame 110 of the valve 100 to collapse uniformly and not fold inward of itself. Stated in another way, an internal support member may provide substantially constant contact points between an outer surface of the internal support member and inner surfaces of the valve, and particularly the prosthetic leaflets L. The internal support member may also be collapsible (e.g. if it is a balloon), so that as the valve 100 is pulled (or pushed) through the funnel 120, the internal support member collapses along with the valve. With this configuration, the prosthetic leaflets L are consistently supported during the collapsing of the valve 100, which may assist in achieving a uniform and repeatable shape of the prosthetic leaflets L during loading. However, as noted above, the internal support member may add additional bulk to the collapsed valve 100 if it remains inside the valve 100 after collapsing.

Figure 3:
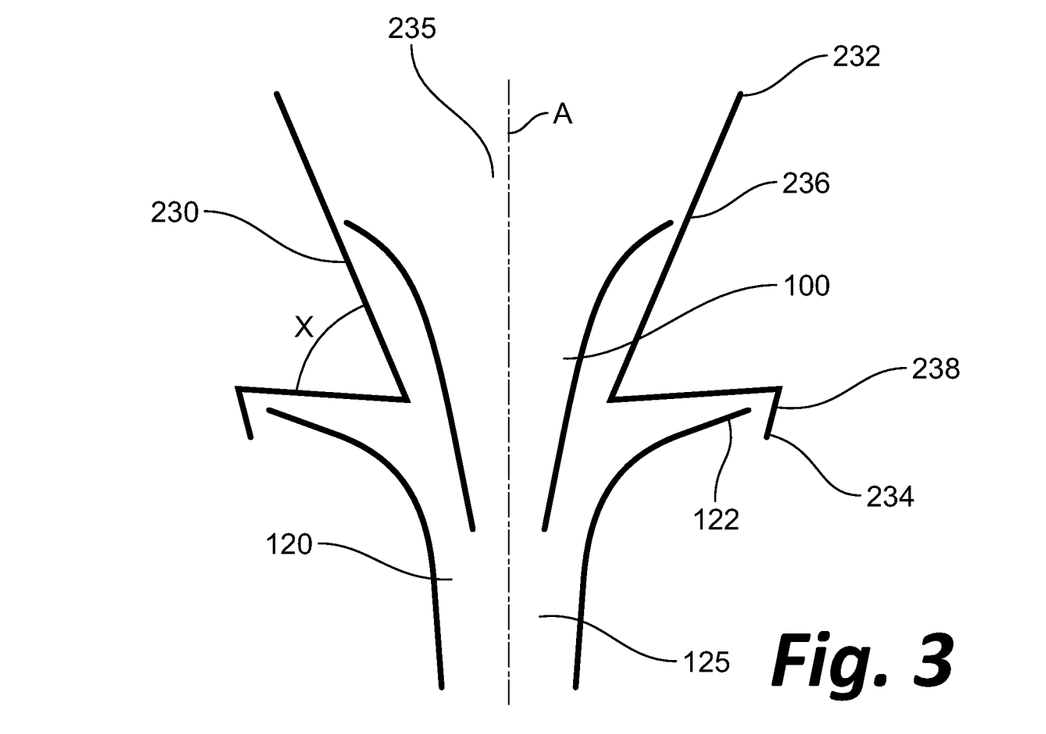
FIG. 3 is a schematic view of the valve of FIG. 1A being loaded into a loading device according to an embodiment of the disclosure.

FIG. 3 illustrates an embodiment of a loading device described herein which may be used for loading a prosthetic heart valve 100 into a delivery device. The loading device of FIG. 3 includes the funnel 120 as described above, with a cone 230 coupled to the entry end 122 of the funnel 120 and extending in a direction opposite the funnel 120. It should be understood that the cone may, but need not be, a perfect cone shape. That is, the shape of the cone may vary from that of a mathematical cone, which includes other funnel shapes that are generally similar to the cone-shape shown and described below. The cone 230 includes a cone body 236 extending from an entry end 232 to an exit end 234, and a cone base 238 coupled to the exit end 234 of the cone body 236. The cone body 236 is generally cone-shaped and has a first diameter at the entry end 232. The diameter of the cone body 236 may taper radially inwardly as the cone body 236 extends from the entry end 232 to the exit end 234. The exit end 234 of the cone body 236 is coupled to the cone base 238, which extends radially outwardly at the exit end 234. The cone body 236 may form an acute angle X with the cone base 238, or alternatively, with a plane generally perpendicular to longitudinal axis A. The angle X may be sufficiently large such that the taper of the diameter of the cone 230 may be a more gradual taper than the taper of the diameter of the funnel 120 described above. That is, as the prosthetic heart valve 100 is advanced in the loading direction through the cone 230 from the entry end 232 to the exit end 234, the valve 100 may collapse at a slower rate as it translates through the cone 230 compared to the rate at which the valve 100 collapses while traveling through the funnel 120. Thus, the force vector applied by the cone 230 to the valve 100 may be directed further in the direction of the exit end 234 compared to the force vector applied by the funnel 120 to the valve 100, relieving the need for an internal support member. In certain examples, angle X may measure any angle between about 30 degrees and about 80 degrees. For instance, angle X may measure approximately 30, 35, 40, 45, 50, 55, 60, 65, 70, 75, or 80 degrees The cone 230 may define a lumen 235, the lumen 235 having a tapering diameter corresponding to an inner surface of the cone body 236. That is, the lumen 235 may have the same diameter as the inner surface of the cone body 236 along any plane extending perpendicular to longitudinal axis A. Thus, the lumen 235 may have a first diameter at the entry end 232 of the cone 230, and the diameter of the lumen 235 may taper radially inwardly as the cone body 236 extends to the exit end 234. The lumen 235 of the cone 230 may align with the lumen 125 of the funnel 120, such that the prosthetic heart valve 100 may translate through the cone 230 in the loading direction from the entry end 232 to the exit end 234 and transition directly into the funnel 120 through the entry end 122. In other words, a thread or string-like material (such as the suture loops described above) extending from the opening of the delivery device may extend through both the funnel 120 and the cone 230 in a direction opposite the loading direction (e.g., from the opening of the delivery device through the exit end 124 and toward the entry end 122 of the funnel 120, and subsequently through the exit end 234 and toward the entry end 232 of the cone 230), be looped around the tabs 112, and pull the valve 100 through the loading device in the loading direction in a single sequence, as described below in greater detail.

In some examples (including the illustrated embodiment in FIG. 3), the diameter of the cone body 236 along the full length of the cone body may taper linearly. In other examples, the diameter of a portion near the entry end of the cone body may have a first linear taper such that a line tangential to the outer surface of the cone body may form a first angle with the longitudinal axis A and a portion near the exit end of the cone body may have a second linear taper such that a line tangential to the outer surface of the cone body may form a second angle with the longitudinal axis A. The second angle may be less than the first angle such that the diameter of the exit portion of the cone body tapers at a slower rate than the diameter of the entry portion of the cone body. In still further examples, the cone body may have a nonlinearly tapering diameter such that the rate at which the diameter of the cone body tapers may decrease gradually as the cone body extends from the entry end to the exit end.

The cone base 238 may couple to the entry end 122 of the funnel 120 in any manner that may promote a secure connection between the cone 230 and the funnel 120. For example, the cone base 238 may form a press-fit connection with the funnel 120. In other examples, the cone base 238 may include a lip, protrusion, or the like, the lip extending radially inward from the cone base such that it may couple to a recess (or other mating feature) on or near the entry end 122 of the funnel 120 to secure the cone 230 to the funnel 120. In still further examples, the cone 230 may rest on the funnel and be held in place by the force applied to the cone 230 by the valve 100 as the valve 100 is translated through the cone 230. In still further examples, the cone base 238 and funnel 120 may be configured to receive a fastener, such as a screw, to be secured to each other.

The cone 230 may be formed of one solid monolithic piece. The cone 230 may be formed of a plastic, polymer, metal or the like suitable for maintaining its shape while receiving a collapsible prosthetic heart valve. For example, the cone 230 may be formed of polyethylene in some aspects, or polyether ether ketone (PEEK) in further aspects.

Figure 4:
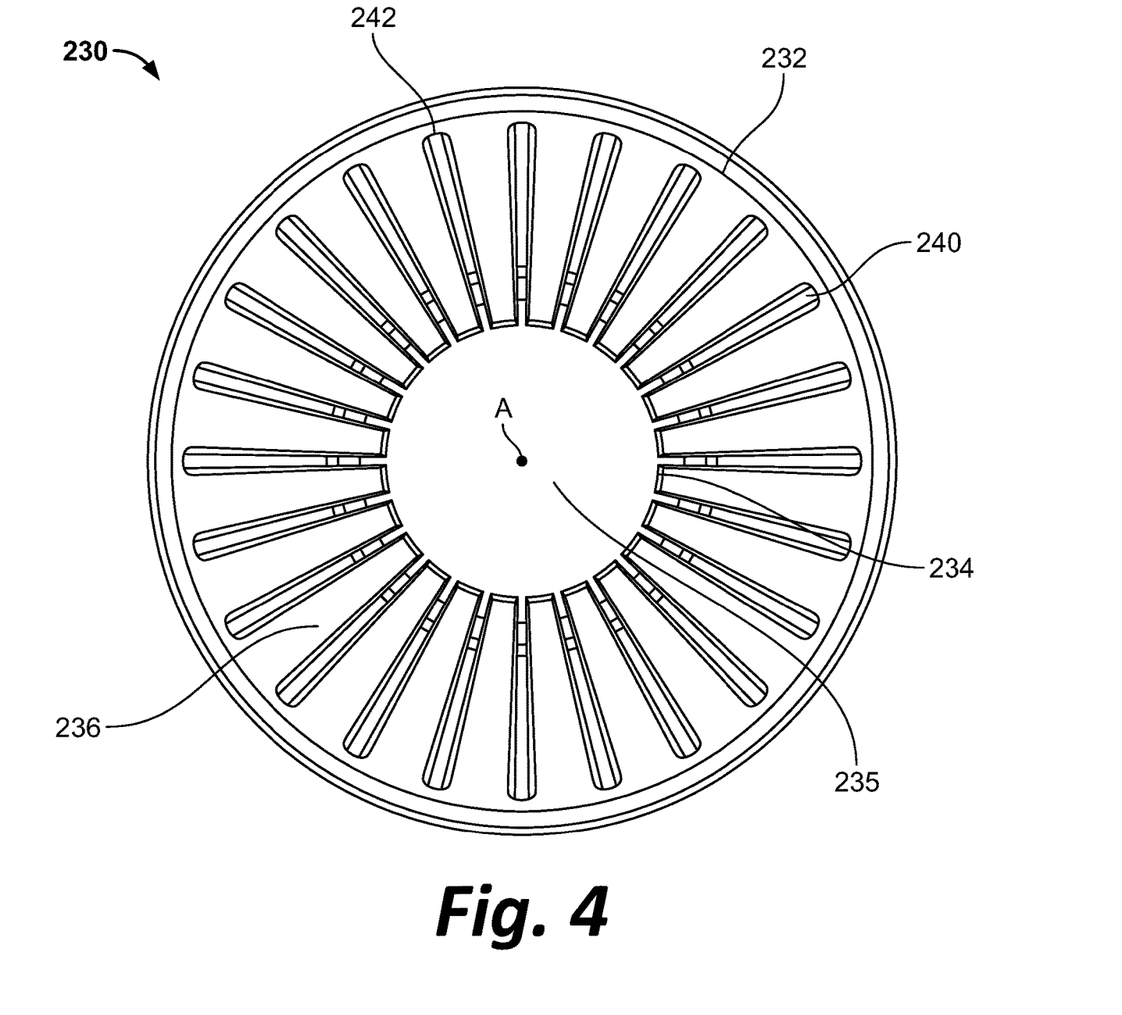
FIG. 4 is a superior view of a loading device according to an embodiment of the disclosure.

FIG. 4 illustrates a superior view of the cone 230 Cone 230 includes slots 240 extending along the surface of the cone body 236. The cone 230 may have a thickness and the slots 240 may extend through the entire thickness of the cone 230 as illustrated, or alternatively through part of the thickness of the cone 230, so long as the slots 240 are sufficiently deep such that the free ends of the tines 109 do not contact and/or scrape the interior of the cone within the slots as the valve 100 translates through the cone 230. Each slot 240 extends generally in a plane extending at an oblique angle to the longitudinal axis A of the cone 230. Slots 240 include a plurality of slots disposed along the cone body 236 and spaced approximately equal distances apart. In the illustrated embodiments, cone 230 includes 24 slots, and outer frame 108 includes 24 tines 109. Each slot 240 is a long and narrow partial or complete void defined by the cone body 236 configured to receive a corresponding tine 109 of the prosthetic heart valve 100. Each slot 240 extends from the circumference of the exit end 234 of the cone body 236 to a circumferential axis near (but preferably spaced apart from) the circumference of the entry end 232 of the cone 230. In other words, the slots 240 need not extend up to and through the entry end 232 of the cone, but may stop short before reaching the entry end 232, leaving a portion of the cone body 236 as a solid continuous portion 242 around the circumference. However, the slots 240 may extend up to and through the exit end 234 of the cone body 236. As shown in FIGS. 1A-B, the valve 100 includes tines 109 extending generally radially outward from the frame 110 (and particularly the outer frame 108) of the valve 100. Tines 109 are spaced approximately equal distances apart around the outer circumference of the frame 110, which distance may correspond to (e.g. be equal to) the spacing between adjacent slots 240. Tines 109 have generally traumatic tips that may scrape along the interior surface of the cone 230 as the valve 100 translates through the cone. To accommodate for the traumatic tips of the tines 109, each tine 109 may align with a slot 240 in the cone 230. As the valve 100 translates through the cone 230, each tine 109 may protrude through a corresponding slot 240, while the cone 230 may contact the valve 100 and apply an inward force against the surface area of the valve 100 surrounding the tines 109. In other words, the valve 100 may be gradually compressed as it is translated through the cone 230 while the tines 109 (and particularly the traumatic free ends of the tines) generally do not contact any solid surface of the cone 230. Such an arrangement may help to avoid scraping of the tines 109 against the cone 230 which may lead to particulate generation and/or wear of both the tines 109 and the cone 230. Further, the evenly spaced structure of the tines 109 and the corresponding evenly spaced structure of the slots 240 may promote an even or uniform collapse of the valve 100 by forcing radial symmetry of the valve 100 as it collapses through the cone 230. That is, the nature of passing the tines 109 through the slots 240 maintains equal positioning of the tines 109 with respect to each other as the valve 100 is collapsed, causing a uniform collapse of the valve 100 and reducing and/or eliminating the need for an internal support member to form an evenly collapsed valve.

The method of loading the prosthetic heart valve 100 into the catheter of a delivery device may begin with the valve 100 in an expanded condition. The loading device, including the funnel 120 coupled to the cone 230, may be coupled to a delivery device such that the exit end 124 of the funnel 120 is nested or otherwise positioned inside a portion of the delivery device, e.g., at or adjacent a valve-holding compartment of the delivery device. A group of threads, or other string-like material (including the suture loops described above), may have a first end coupled to the delivery device and second free ends (e.g. the loops of the suture loops) that extend from the delivery device, the suture loops extending through the lumen 125 of the funnel 120 and the lumen 235 of the cone 230 of the loading device in a direction opposite the loading direction. The suture loops may be looped around the tabs 112 of the valve 100. The valve 100 may be pulled in the loading direction through the entry end 232 of the cone 230, the valve 100 oriented in such a way that each tine 109 aligns with a corresponding slot 240 on the cone 230. As the valve 100 is advanced in the loading direction through the lumen 235 of the cone 230, the cone body 236 may contact the outer surface of the valve 100 and apply a compressive force to collapse the valve 100 radially inward. As the valve 100 advances in the loading direction, the force applied by the cone body 236 is directly proportional to the tapering diameter of the cone body 236.

As the valve 100 reaches the exit end 234 of the cone body 236, the valve 100 is further advanced in the loading direction and transitions from contacting the cone 230 to contacting the funnel 120. The entry end 122 of the funnel 120 may have a diameter equal to or greater than the exit end 234 of the cone body 236, such that the valve 100 may transition smoothly from the cone 230 to the funnel 120. In other words, the valve 100 may remain substantially the same size or slightly expand radially as the valve 100 transitions from the lumen 235 of the cone 230 to the lumen 125 of the funnel 120. The funnel 120, similar to the cone 230, contacts the outer surface of the valve 100 and applies a compressive force to further collapse the valve 100 radially inward, as described above. The diameter of the funnel 120 may taper to a diameter smaller than the diameter of the exit end 234 of the cone 230. The exit end 124 of the funnel 120 may have a diameter smaller than the diameter of the catheter. It should be understood that, by the time the valve 100 begins to enter the funnel 120, the tines 109 may have collapsed enough (e.g. are pointing more toward the longitudinal axis A than pointing radially outward from the longitudinal axis A) so that the traumatic ends of the tines 109 are less likely to scrape against the interior surface of the funnel 120. Thus, the valve 100 may be translated through the length of the cone 230 with the tines 109 disposed within the slots 240 up to and through the exit end 234 of the cone 230 so as to avoid scraping any portion of the cone 230, and the radial compression of the valve 100 from the cone 230 may be sufficient such that the tines 109 no longer point radially outward as the valve 100 transitions from the cone 230 to the funnel 120. In any event, the funnel 120 may be formed of a material resistant to scraping of the tines, for example metals, to accommodate for scenarios in which the valve 100 is not sufficiently compressed such that the tines 109 do not reach the point of extending generally in the direction of longitudinal axis A.

After the valve 100 is translated completely beyond the cone 230, the cone 230 may be decoupled from the funnel 120 and removed. The funnel 120 may be coupled to the delivery system such that the exit end 124 of the funnel 120 may be disposed inside (or adjacent) the opening of the catheter of the delivery system, and the funnel 120 may be used for final positioning of the valve 100 within the delivery system. It should be understood that the coupling between the funnel 120 and the delivery system may occur prior to the beginning of drawing the valve 100 through the cone 230. The valve 100 may transition smoothly from the funnel 120 to the catheter in a manner substantially similar to transitioning from the cone 230 to the funnel 120. The delivery system may include a translatable sheath that is in a retracted position during the start of the loading procedure. As the valve 100 exits the exit end 124 of the funnel 120, the translatable sheath may be advanced over the collapsed valve 100 so that the valve 100 is maintained in the collapsed condition. Thus, as more of valve 100 continues to exit the loading device, the sheath may continue to translate until the entirety of the valve 100 is secured in the collapsed condition with the sheath overlying the valve 100 and maintain the entire valve in the collapsed condition. After the valve 100 is fully loaded in the delivery system such that the valve 100 is completely disposed in its final position in a collapsed condition within the catheter, the funnel 120 may be decoupled and removed from the delivery system.

According to one aspect of the disclosure, a loading system for collapsing a prosthetic heart valve comprises:
a slotted cone having a cone body and a cone base;
the cone body extending from a first end to a second end and having a cone body surface, the cone body having a first diameter at the first end and a second diameter less than the first diameter at the second end, the cone body defining a plurality of slots extending along the cone body surface between the first and second ends, the plurality of slots radially spaced around the cone body surface and extending through an entire thickness of the cone body surface, the cone body further defining a lumen internal to the cone body surface; and
the cone base extending radially outward from the second end of the cone body; and/or
the longitudinal slots are equidistantly spaced around a circumference of the cone body surface and are configured to receive therethrough tines or barbs from the prosthetic heart valve; and/or
the cone body has a first circumference at the first end and a second circumference at the second end, each slot having a first end positioned a spaced distance from the first circumference, and a second end positioned at the second circumference; and/or
a funnel, wherein the cone base is coupled to the funnel in an assembled condition of the loading system; and/or
an angle greater than about 30 and less than about 80 degrees is defined between the cone base the cone body surface; and/or
the plurality of slots extend through an entire thickness of the cone body surface.

According to another aspect of the disclosure, a loading system for collapsing a prosthetic heart valve comprises:
a cone extending from a first cone end to a second cone end, the cone having a cone body that is cone-shaped, the cone body extending from a first cone body end to a second cone body end, the cone body defining a lumen therethrough having a lumen diameter that tapers as the lumen extends from the first cone body end to the second cone body end, the cone body further having a cone body surface defining a plurality of slots therethrough, the cone further having a cone base extending radially from the second cone body end; and
a funnel coupled to the cone base in an assembled condition of the loading system, the funnel extending from a first funnel end to a second funnel end and defining a lumen therethrough having a funnel diameter tapering as the lumen extends from the first funnel end to the second funnel end; and/or
the first funnel end has a first diameter and the second cone body end has a second diameter, the first diameter being equal to the second diameter; and/or
the first funnel end has a first diameter and the second cone body end has a second diameter, the first diameter being greater than the second diameter; and/or
the cone body lumen diameter tapers linearly between the cone body first end and the cone body second end; and/or
the cone body lumen diameter tapers linearly from the first cone body end to a middle portion of the cone body at a first angle relative to a longitudinal axis of the cone, and the cone body lumen diameter tapers linearly from the middle portion of the cone body to the second cone body end at a second angle relative to the longitudinal axis, the first angle being greater than the second angle; and/or
the cone body lumen diameter tapers from the first cone body end to the second cone body end such that a rate at which the cone body lumen diameter tapers decreases as the cone body extends from the first cone body end to the second cone body end; and/or
the cone base is coupled to the funnel by a press-fit in the assembled condition of the loading system; and/or
the cone base includes a protrusion that is configured to couple to a recess of the funnel in the assembled condition of the loading system; and/or
the cone base is coupled to the funnel with a fastener in the assembled condition of the loading system; and/or
the cone body lumen and the funnel lumen are aligned to define a continuous loading system lumen in the assembled condition of the loading system; and/or
the second end of the funnel is sized to be received at least partially within a delivery device.

According to another aspect of the disclosure, a method for collapsing a prosthetic heart valve comprises:
coupling a thread to a first end of the prosthetic heart valve in an expanded condition;
orienting the prosthetic heart valve to align a plurality of tines extending radially from the prosthetic heart valve with a plurality of slots defined by a cone; and
pulling the thread to pull the prosthetic heart valve in a loading direction to translate the prosthetic heart valve through a lumen of the cone, the cone having a tapering diameter to compress the prosthetic heart valve; and/or
orienting the prosthetic heart valve includes aligning each one of the plurality of tines with a corresponding one of the plurality of slots; and/or
coupling a funnel to the cone, the cone having an exit end that is coupled to an entry end of the funnel in an assembled configuration; and/or
pulling the thread translates the prosthetic heart valve through a lumen of the funnel to further compress the prosthetic heart valve into a collapsed condition having a radial profile configured to fit within a delivery device; and/or uncoupling the cone from the funnel after the prosthetic heart valve is translated past the cone; and/or the lumen of the funnel and the lumen of the cone extend along a shared longitudinal axis; and/or pulling the thread to translate the prosthetic heart valve through the lumen of the cone compresses the prosthetic heart valve, the prosthetic heart valve having no internal support member disposed radially inward of at least one leaflet coupled to the prosthetic heart valve.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A loading system for collapsing a prosthetic heart valve, the loading system comprising:
   a slotted cone having a cone body and a cone base;
   the cone body extending from a cone body entry end to a cone body exit end and having a cone body surface, the cone body having a first circumference at the cone body entry end and a second circumference at the cone body exit end, with a portion of the cone body defining a solid continuous portion around the first circumference, the cone body having a first diameter at the cone body entry end and a second diameter less than the first diameter at the cone body exit end, the cone body defining a plurality of slots extending along the cone body surface between the cone body entry and exit ends, the plurality of slots radially spaced around the cone body surface, the cone body further defining a lumen internal to the cone body surface, wherein the plurality of slots are equidistantly spaced around a third circumference of the cone body surface and are configured to receive therethrough tines or barbs from the prosthetic heart valve as the prosthetic heart valve advances through the lumen and collapses within the cone body; and
   the cone base extending radially outward from the cone body exit end of the cone body.

2. The loading system of claim 1, wherein each of the plurality of slots has a first end positioned a spaced distance from the first circumference, and a second end positioned at the second circumference.

3. The loading system of claim 1, further comprising a funnel extending from a funnel entry end to a funnel exit end, wherein the cone base is coupled to the funnel entry end in an assembled condition of the loading system.

4. The loading system of claim 1, wherein an angle greater than about 30 degrees and less than about 80 degrees is defined between the cone base and the cone body surface.

5. The loading system of claim 1, wherein the plurality of slots extend through an entire thickness of the cone body surface.

6. The loading system of claim 1, wherein the slotted cone is one solid monolithic piece.

7. The loading system of claim 1, wherein the tines or barbs include traumatic tips and the plurality of slots define a depth such that the traumatic tips of the tines or barbs do not contact or scrape an interior of the cone body surface as the prosthetic heart valve advances through the lumen of the cone body.

8. The loading system of claim 7, wherein the slotted cone is configured to contact the prosthetic heart valve and apply an inward force against a portion of the prosthetic heart valve surrounding the tines or barbs in such a way that the traumatic tips of the tines or barbs do not contact any solid surface of the slotted cone.

9. The loading system of claim 1, wherein a number of the plurality of slots is identical to a number of the tines or barbs of the prosthetic heart valve.

10. A loading system for collapsing a prosthetic heart valve, the loading system comprising:
    a cone extending from a first cone end to a second cone end, the cone having a cone body that is cone-shaped, the cone body extending from a cone body entry end to a cone body exit end, the cone body defining a lumen therethrough having a lumen diameter that tapers as the lumen extends from the cone body entry end to the cone body exit end, the cone body further having a cone body surface defining a plurality of slots therethrough, the cone further having a cone base extending radially from the cone body exit end; and
    a funnel coupled to the cone base in an assembled condition of the loading system, the funnel extending from a funnel entry end to a funnel exit end such that the funnel entry end couples to the cone base in the assembled condition, and the funnel defining a lumen therethrough having a funnel diameter tapering as the lumen extends from the funnel entry end to the funnel exit end.

11. The loading system of claim 10, wherein the funnel entry end has a first diameter and the second cone body exit end has a second diameter, the first diameter being equal to the second diameter.

12. The loading system of claim 10, wherein the funnel entry end has a first diameter and the cone body exit end has a second diameter, the first diameter being greater than the second diameter.

13. The loading system of claim 10, wherein the cone body lumen diameter tapers linearly between the cone body entry end and the cone body exit end.

14. The loading system of claim 10, wherein the cone body lumen diameter tapers linearly from the cone body entry end to a middle portion of the cone body at a first angle relative to a longitudinal axis of the cone, and the cone body lumen diameter tapers linearly from the middle portion of the cone body to the cone body exit end at a second angle relative to the longitudinal axis, the first angle being greater than the second angle.

15. The loading system of claim 10, wherein the cone body lumen diameter tapers from the cone body entry end to the cone body exit end such that a rate at which the cone body lumen diameter tapers decreases as the cone body extends from the cone body entry end to the cone body exit end.

16. The loading system of claim 10, wherein the cone base is coupled to the funnel entry end by a press-fit in the assembled condition of the loading system.

17. The loading system of claim 10, wherein the cone body lumen and the funnel lumen are aligned to define a continuous loading system lumen in the assembled condition of the loading system such that the prosthetic heart valve translates through the cone in a loading direction from the cone body entry end to a cone body exit end and transitions directly into the entry end of the funnel.

18. The loading system of claim 10, wherein the funnel exit end is sized to be received at least partially within a delivery device.

19. The loading system of claim 10, wherein the cone body has a first circumference at the cone body entry end and a second circumference at the cone body exit end, each slot having a first end positioned at the first circumference and a second end positioned at the second circumference.

20. The loading system of claim 10, wherein the cone rests on the funnel and is held in place, in the assembled condition of the loading system, by force applied to the cone by the prosthetic heart valve as the prosthetic heart valve is translated through the cone.

* * * * *